N. TESTRUP, T. RIGBY & O. SODERLUND.
UTILIZATION OF PEAT.
APPLICATION FILED AUG. 1, 1912.
1,164,429.
Patented Dec. 14, 1915.
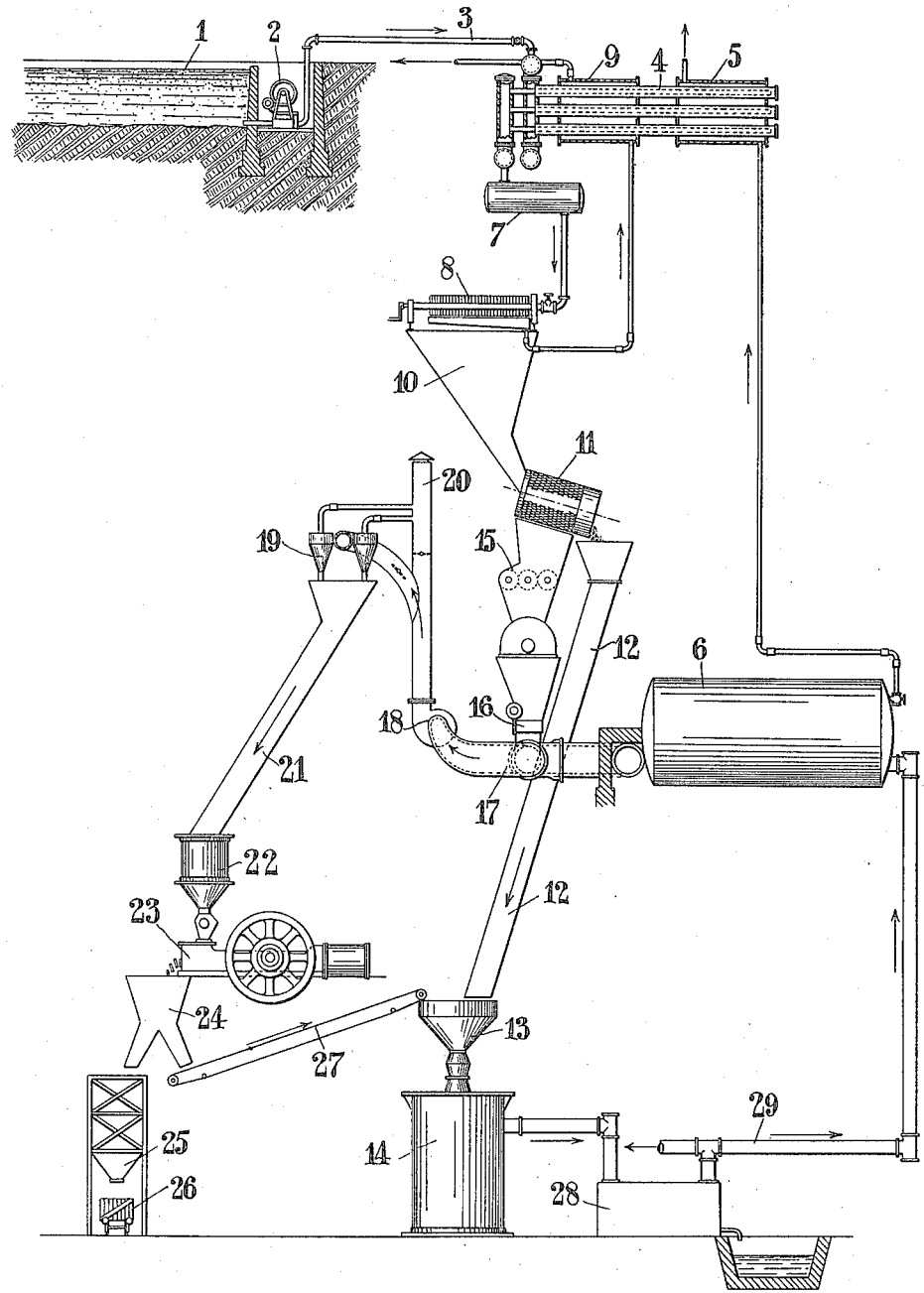
WITNESSES
INVENTORS
Nils Testrup
Thomas Rigby and Olof Söderlund
BY
ATTORNEY

UNITED STATES PATENT OFFICE.

NILS TESTRUP, OF LONDON, ENGLAND, THOMAS RIGBY, OF DUMFRIES, SCOTLAND, AND OLOF SÖDERLUND, OF LONDON, ENGLAND, ASSIGNORS TO WETCARBONIZING LIMITED, OF LONDON, ENGLAND.

UTILIZATION OF PEAT.

1,164,429.

Specification of Letters Patent.

Patented Dec. 14, 1915.

Application filed August 1, 1912. Serial No. 712,745.

*To all whom it may concern:*

Be it known that we, NILS TESTRUP, a subject of the King of Great Britain and Ireland, and residing at 6 Broad Street Place, London, E. C., England, THOMAS RIGBY, a subject of the King of Great Britain and Ireland, and residing at Station Hotel, Dumfries, Scotland, and OLOF SÖDERLUND, a subject of the King of Sweden, and residing at "Fairlawn," Clarence Road, Clapham Park, London, S. W., England, have invented certain new and useful Improvements Relating to the Utilization of Peat, of which the following is a specification.

This invention relates to the utilization of peat. In order to render such utilization economical, it has been found necessary on account of the large amount of water in the peat to gasify a very large proportion of the treated material to supply the power and fuel needs of the process. If, however, the material so employed is gasified in by product recovery gas producers under certain conditions, it becomes immaterial to what extent within wide limits the material is gasified on account of recovery of the valuable products which, under most circumstances, occur in the peat to such an amount, and have such a market value, that they represent finally as great a value as the material gasified. Moreover, by gasifying the material under these conditions, sufficient products of combustion are produced, to enable the process to be carried out by the use of them under conditions of markedly increased economy. A process for artificially rendering the bound water of raw peat free, and therefore of allowing drying to a low moisture content, has been proposed by Ekenberg. It consists in heating the peat to a moderately high temperature under pressure, and is referred to as wet carbonization throughout the specification.

According to the present invention, the peat, after wet carbonization and removal of the bulk of its liquid matter by internally transmitted pressure, as in a filter press, has a further quantity of water removed from it, either by treatment in a band or like press, or by exposing it to hot products of combustion from apparatus employed in the process, part of the partially dried material being supplied to ammonia recovery gas producers, and the remainder converted into gaseous fuel product.

A modification of the invention is based upon the observation that peat which has been wet carbonized by a process such as proposed by Ekenberg, and has been separated from the bulk of its water in a filter press gives a strong press cake, which, when admixed with a suitable proportion of briquets made from wet carbonized peat, or of such briquets coked, to give an average water content of about 55% can be gasified at a relatively high rate without decrepitation or crumbling, or the production of dusty gas. This is apparently attributable to the fact that a definite and presumably cellular arrangement or channeled structure is imparted to the material in its separation from water in the filter press which gives the material strength and enables the contained water to become vaporized when the cake is introduced into the producer without bursting the cake or causing it to crumble.

In its modified form the invention consists therefore in a method of working a gas producer, consisting in employing therein as a substantial part of the charge of fuel wet carbonized peat in the form of press cake admixed with briquets of wet carbonized peat, or the same after coking.

An installation suitable for carrying the present invention into effect is diagrammatically illustrated in the accompanying drawing.

The peat which has previously been reduced to a pulp and stored in a reservoir 1 is forced by a pump 2 through a pipe 3 into a wet carbonizing apparatus 4 of the well-known concentric tube type, which is heated by a steam jacket, receiving steam from a boiler 6. The carbonizer tubes are preferably stationary and peat forced through them at such a rate as to prevent deposition of the peat on the tube walls without the use of spiral or other devices between the tubes, a separate vessel being provided for maintaining the heated material, at or about the maximum temperature usually in the neighborhood of 180° C., until treatment is completed to the desired extent. The treated pulp is then delivered into a vessel 7, which insures a steady supply of material to a filter press 8, wherein the water content of the material is reduced to about 68 per cent. The effluent from the filter press is passed through a jacket 9 to preheat peat entering the carbonizer, and thereafter may be concentrated and treated for the recovery of nitrogenous matter therefrom. The solid material in the form of press cakes passes down a hopper 10, into a sieve 11, through which only the fine material can pass, the larger lumps passing down a chute 12 into the hopper 13 of a gas producer 14.

The material passing through the sieve 11 is reduced to a powder in a pulverizer 15, and then falls into a hopper, from which it is dispersed by a controlling valve 16 in a current of hot gas drawn through a duct 17, by a fan 18 from the furnace flue of the boiler 6. The powdered material is carried along the duct 17 by the gases until dried to the desired extent, say to a water content of 45% and then enters cyclone separators 19, from which the separated gases pass to the chimney 20, while the powder falls down a chute 21 into the hopper 22 of a briqueting press 23. If desired the cool gases from the duct 17 may be used to effect a preliminary drying of the material to be afterward dispersed in the hot gases and may also be used in part to supply some of the vapor required by gas producers of the installation. If necessary the powder may be further dried to a moister content of some 10% before being delivered to the press 23. From the latter the briquets in any case pass into a hopper 24 which delivers any excess of briquets into a bunker 25 for loading railway wagons 26, and the greater part of the briquets to a conveyer 27 carrying them to the hopper 13 of the gas producer 14, whereby the latter is supplied with a mixture of press cakes and briquets. The gas from the producer is treated in the usual way in by product recovery plant 28, chiefly to obtain sulfate of ammonium, a part of the gas being thereafter taken by a pipe 29 to be utilized for heating the boiler 6. In this way the process results in the production of fuel briquets, producer gas and sulfate of ammonium.

In a modified form of the process, the solid material from the filter press is treated in a band press, which reduces its water content to about 55 per cent., whereupon the material is divided into two portions. One of the latter is supplied to a gas producer to yield producer gas, tar and sulfate of ammonium, while the other portion is pulverized, dried in a rotary drier, and then briqueted. Likewise, instead of dividing the press cakes into two portions, the whole may be subjected to band pressing, and supplied directly to the gas producer when reduced to a water content of about 55 per cent.

In order more clearly to indicate the effect resulting from the various operations of the process of peat utilization hereinbefore described, the following may be given as an example where the quantities involved in carrying out the process in one of the forms described are given.

Commencing with raw peat containing 90 per cent. of water, this is by carbonization changed to a mixture of 9.05 parts of peat solids and 90.95 parts of water. In the filter press the water is reduced to 68 per cent., leaving 8 parts of peat solids and 17 parts of water. The band press or waste heat driers now reduce the water content to 55 per cent., that is, 8 parts of peat solids and 9.77 parts of water. This product is now divided into equal parts, one part giving 4 parts of peat in briquet form, and an evolution of 4.88 parts of water in the Schulze driers, and the other part giving the sulfate of ammonium (reckoned at a 70 per cent. recovery which is easily attainable) tar and gas corresponding to the other 4 parts of the peat solids. This is a sufficiency of gas for the needs of the process, and therefore there results without outside cost from 10 parts of peat solids, 4 parts of briquets and sulfate and tar corresponding to 4 parts of peat solids.

Having now described our invention what we claim as new and desire to secure by Letters Patent is:—

1. A process for making gas from peat, consisting in heating the raw peat to a temperature above the boiling point of its contained liquid, while maintaining a superincumbent pressure sufficient to prevent ebullition, forthwith subjecting the treated material to filter pressing, then removing a further portion of the remaining liquid and converting the material into fuel gas.

2. A process for making gas from peat, consisting in heating the raw peat to a temperature above the boiling point of its contained liquid while maintaining a superincumbent pressure sufficient to prevent ebullition, forthwith subjecting the treated material to filter pressing, removing a further portion of the remaining liquid by mechanical pressing, and converting the material into fuel gas.

3. A process for making gas and ammonia from peat consisting in heating the raw peat to a temperature above the boiling point of its contained liquid while maintaining a superincumbent pressure sufficient to prevent ebullition, forthwith subjecting the treated material to filter pressing under pressure, dividing the filter-pressed material into two portions, then removing a further quantity of the remaining liquid from one of said portions, mixing this portion with the remainder of the filter-pressed material, and gasifying the mixture.

4. A process for making gas from peat, consisting in reducing the peat to a fluid pulp, heating said pulp to a temperature above its boiling point, while maintaining a superincumbent pressure sufficient to prevent ebullition, forthwith subjecting the fluid pulp to filtration under pressure, reducing the resulting filter-pressed material to a powder and drying the latter by suspension in waste gases, briqueting the dried powder and converting the briqueted material into fuel gas.

5. A process for making gas and ammonia from peat, consisting in reducing the peat to a fluid pulp, heating said pulp to a temperature above its boiling point while maintaining a superincumbent pressure sufficient to prevent ebullition, forthwith subjecting the fluid pulp to filtration under pressure, pulverizing the filter-pressed material and drying the resulting powder by a suspension in hot gases, the latter of which, after having effected the final drying of the powdered material, are utilized to effect the preliminary drying of the same, briqueting the powdered material and converting the same into fuel gas by partial combustion, and thereupon extracting ammonia from the gas.

6. A process for making gas from peat, consisting in reducing the peat to a fluid pulp, heating said pulp to a temperature above its boiling point, while maintaining a superincumbent pressure sufficient to prevent ebullition, forthwith subjecting the fluid pulp to filtration under pressure, dividing the filter-pressed material into two portions, pulverizing one portion of said material, drying the pulverized material by suspension thereof in hot waste gases then briqueting the dried material, mixing the briqueted material with the untreated portion of the filter-pressed material and then converting the mixture into fuel gas.

7. An installation for obtaining gas and ammonia from peat, comprising in combination disintegrating means for reducing the peat to a fluid pulp, a wet carbonizer in which said pulp is heated to a temperature above its boiling point under pressure sufficient to prevent ebullition, filter-pressing means in which part of the contained liquid in the heated material is removed, a sieve means by which the material is further dried, briqueting means, a gas producer in which the dried material is converted into fuel gas, conveyers from the sieve and briqueting means to the producer, and ammonia recovery means through which said gas is passed.

8. An installation for obtaining gas and ammonia from peat, comprising in combination means for reducing the peat to a fluid pulp, a wet carbonizer in which said pulp is heated to a temperature above its boiling point at a superincumbent pressure sufficient to prevent ebullition, filter-pressing means in which part of the liquid in the heated material is removed, a sieve, mechanical pressing means for removing a further part of said liquid, briqueting means, a gas producer in which the pressed material is converted into fuel gas, conveyers from the sieve and briqueting means to the producer, and ammonia recovery means through which said gas is passed.

9. An installation for obtaining gas and ammonia from peat, comprising in combination means for reducing the peat to a fluid pulp, a wet carbonizer in which said pulp is heated to a temperature above its boiling point under a superincumbent pressure sufficient to prevent ebullition, filter-pressing means in which part of the liquid contained in the heated material is removed, a sieve, pulverizing means by which the filter-pressed and sieved material is reduced to a fine powder, a duct conveying a current of hot waste gases into which said powder is introduced and retained until sufficiently dried by suspension, briqueting means to which the dried powder is supplied, a producer for converting the resulting briquets into fuel gas, conveyers from the sieve and briqueting means to the producer, and ammonia recovery means in which the gas is treated.

10. An installation for obtaining gas and ammonia from peat comprising in combination means for reducing the peat to a fluid pulp, a wet carbonizer in which said pulp is heated to a temperature above its boiling point under a superincumbent pressure sufficient to prevent ebullition, said pulp being forced through the carbonizer at such a speed that deposition of the pulp in the carbonizer is prevented, means for maintaining the pulp at the desired temperature for the required time in said carbonizer, filter-pressing means in which part of the liquid is removed from the heated material, means for further drying the filter-pressed material, a sieve, briqueting means, a gas producer in which the material is converted into fuel gas, conveyers from the sieve and briqueting means to the producer, and means by which ammonia is recovered from said gas.

In testimony whereof we have signed our names to this specification in the presence of two subscribing witnesses.

NILS TESTRUP.
T. RIGBY.
OLOF SÖDERLUND.

Witnesses to the signatures of Nils Testrup and Olof Söderlund:
 BERTRAM H. MATTHEWS,
 J. G. CRAWLEY.

Witnesses to the signature of Thomas Rigby:
 BERTRAM H. MATTHEWS,
 JOHN H. JOHNSTON.